Jan. 24, 1967  D. V. RICHARDSON ETAL  3,300,785
MULTIPLEX RECORDING APPARATUS
Filed July 31, 1964  3 Sheets-Sheet 2

INVENTORS
DONALD V. RICHARDSON
JOSEPH A. PICARD JR.
BY Shenier & O'Connor
ATTORNEYS 3,300,785
MULTIPLEX RECORDING APPARATUS
Donald V. Richardson, Stratford, and Joseph A. Picard, Jr., Ansonia, Conn., assignors to United Aircraft Corporation, East Hartford, Conn., a corporation of Delaware
Filed July 31, 1964, Ser. No. 386,511
25 Claims. (Cl. 346—17)

Our invention relates to multiplex recording apparatus and more particularly to airborne monitoring systems for gas turbine engines.

There are many measurements for gas turbine engines which may be made to determine their operating condition. Furthermore, most transport aircraft are provided with a plurality of engines. Equipment to measure and record simultaneously each of the parameters for each of the engines might require as many as fifty channels; and such equipment would be bulky, heavy and expensive.

One object of our invention is to provide a recording system in which a common parameter for each of the various engines is recorded in time-division-multiplex.

Another object of our invention is to provide a system in which the various parameters of a single engine are recorded in time-division-multiplex.

Still another object of our invention is to provide a recording system in which the nature of the time-shared information recorded is indicated by one or more coding channels.

A further object of our invention is to provide an overlay chart which simplifies the interpretation both of the recorded values in the information channels and of the nature of the recorded information which is provided by a recording in the one or more coding channels.

Other and further objects of our invention will appear from the following description.

In general our invention contemplates the provision of a pair of analog recording channels such, for example, as galvanometer driven recording pens. The first channel contains information recorded in time-division-multiplex. The second recording channel contains digital information which is presented in analog form to identify the nature of the information recorded in the first channel. We provide a transparent overlay sheet containing a number of rows of indicia corresponding to the number of channels. Where the information recorded in the first channel is a parameter common to all engines then a single column of indicia will suffice for interpreting the value of that common parameter. If an additional parameter is also to be recorded in the first channel then an additional column of indicia is provided for interpreting recorded representations of the new parameter. The digitally presented analog coded information in the auxiliary channel identifies not only the engine, a parameter of which is being recorded, but also identifies the nature of the parameter and hence the column in the overlay sheet which is to be used in reading the recorded information.

In the accompanying drawings which form part of the instant specification and which are to be read in conjunction therewith and in which like reference numerals are used to indicate like parts in the various views:

FIGURE 6 shows a recording upon which is superposed a further form of overlay sheet.

Figure 1:
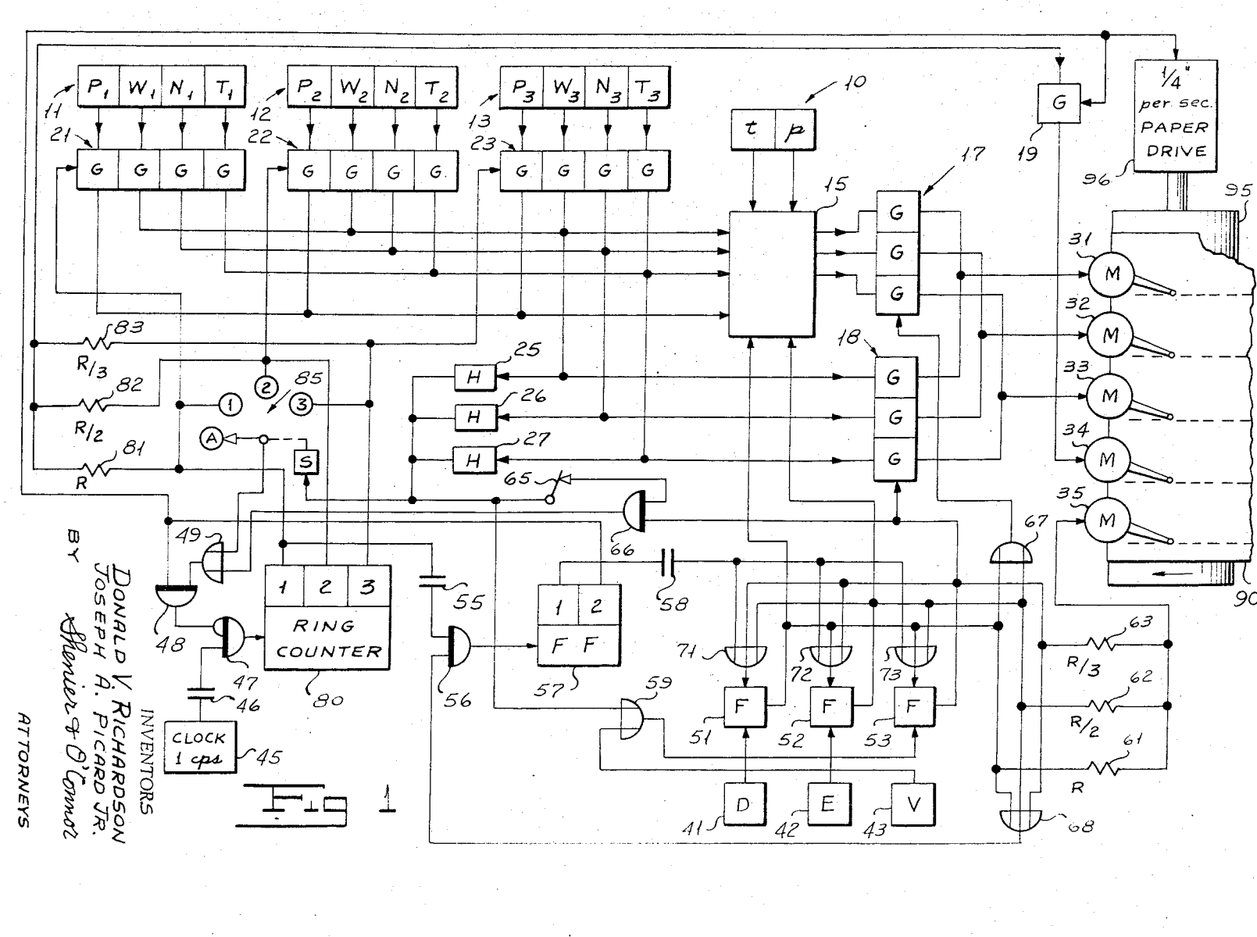
FIGURE 1 is a schematic view showing our engine monitoring system.

More particularly referring now to FIGURE 1 of the drawings, we have assumed that the aircraft is provided with three gas turbine engines, each provided with transducers for measuring the engine pressure ratio P (which constitutes the pressure at the inlet of the exhaust nozzle divided by the pressure at the outlet of the intake diffuser), the fuel flow W (which may be expressed in pounds per hour), the rotational speed N (which for twin-spool engines might comprise that of the high-pressure, high-speed compressor and turbine), and the exhaust gas temperature T (which exists at the inlet of the exhaust nozzle). The transducers associated with engine number 1 are indicated generally by reference numeral 11 and are provided with the subscript 1, those associated with engine number 2 by the reference numeral 12 and are provided with the subscript 2, and those associated with engine number 2 by the reference numeral 12 and are provided with the subscript 3. We further provide transducers indicated generally by the reference numeral 10 for measuring the temperature $t$ and the pressure $p$ at the outlet of the intake diffuser of any one of the engines since these parameters depend only upon ambient temperature and pressure and Mach number. Transducers 10 may alternatively be mounted within a small auxiliary pod containing a diverging intake diffuser and a converging exhaust nozzle so that all engines are interchangeable. The outputs of transducers 10 are coupled to a computer 15 which is fully shown and described in the copending application of Donald V. Richardson for Jet Engine Analyzer, Serial No. 259,496, filed February 19, 1963, now Patent No. 3,238,768. As shown in this copending application, computer 15 selectively provides outputs representing the percentage deviations, DW and DN and DT, in fuel flow and rotative speed and exhaust gas temperature from their proper values as functions of the engine pressure ratio for an engine in perfect condition. Computer 15 also selectively provides outputs representing the actual errors, EW and EN and ET, in fuel flow and rotative speed and exhaust gas temperature from their proper values as functions of the engine pressure ratio for an engine in perfect condition.

The outputs of the groups of transducers 11, 12, and 13 are coupled to respective multiple gates 21, 22, and 23. Corresponding outputs of gates 21 through 23 are each applied to a corresponding input of computer 15. The W, N, and T inputs of computer 15 are also coupled to respective hysteresis circuits 25, 26, and 27 and also to multiple gates 18. Hysteresis circuits 25, 26, and 27 provide outputs only when the fuel flow or rotative speed or the exhaust gas temperature of an engine exceeds a predetermined limit. The three outputs of computer 15 are coupled to multiple gates 17. Corresponding outputs of gates 17 and 18 are each applied to corresponding galvanometer driven recording pens 31, 32, and 33. A clock source 45 having a constant frequency of one cycle per second provides output pulses which are coupled through capacitor 46 to one input of an AND circuit 47, the output of which actuates a three-stage ring counter 80. The 1, 2, and 3 outputs of ring counter 80 are coupled through respective resistors 81, 82, and 83 having resistance values R, $R/2$, and $R/3$ to the input of a gate 19, the output of which is applied to a galvanometer driven recording pen 34. The 1, 2, and 3 outputs of ring counter 80 actuate respective multiple gates 21, 22, and 23. The 1, 2, and 3 outputs of ring counter 80 are further coupled to corresponding contacts of a four-position manually-operable switch indicated generally by the reference numeral 85. The 1 output of ring counter 80 is coupled through a capacitor 55 to one input of an AND circuit 56, the output of which drives a counting flip-flop 57, which may comprise a two-stage ring counter. Manually operable push buttons 41, 42, and 43 are actuated where it is desired to record either the percentage deviations D or the actual errors E or the raw values V of the various engine parameters. Push button switches 41 and 42 are directly applied to the "set" inputs of flip-flops 51 and 52; and push button switch 43 is coupled through an OR circuit 59 to the set input of flip-flop 53. The outputs of flip-flops 51, 52, and 53 are applied through respective resistors 61, 62, and 63 having resistance values R, R/2, and R/3 to a galvanometer driven recording pen 35. The outputs of flip-flops 51, 52, and 53 are coupled through a three-input OR circuit 68 to the other input of AND circuit 56. The outputs of flip-flop 51 and 52 are coupled through a two-input OR circuit 67 to actuate multiple gates 17. The output of flip-flop 53 actuates multiple gates 18, and is coupled to one input of an AND circuit 66, and to one input of each of OR circuits 71 and 72. The outputs of flip-flops 51 and 52 are applied to computer 15, causing it to provide selectively either percentage deviations D or actual errors E. The output of flip-flop 51 is coupled to a second input of OR circuit 72 and to one input of OR circuit 73. The output of flip-flop 52 is coupled to a second input of each of OR circuits 71 and 73. The 1 output of the two-stage ring counter flip-flop 57 is coupled through a capacitor 58 to a third input of each of OR circuits 71, 72, and 73. The outputs of OR circuits 71, 72, and 73 are coupled to the respective "reset" inputs of flip-flops 51, 52, and 53. The construction of flip-flops 51 through 53 is such that the presence of a signal at the reset input not only resets the flip-flops but also prevents their being set. The outputs of hysteresis circuits 25, 26, and 27 are applied to a winding S, associated with manually operable switch 85, which returns the armature thereof to a fourth position A. The outputs of hysteresis circuits 25 through 27 are coupled to a second input of OR circuit 59 and are also aplied through a normally closed, manually operable switch 65 to a second input of AND circuit 66. The armature of switch 85 and the output of AND circuit 66 are coupled through an OR circuit 49 to one input of an AND circuit 48. The 2 output of counting flip-flop 57 is applied to a second input of AND circuit 48 and to a motor 96 which is coupled to a paper drive drum 95 around which is partially wound the recording paper 90. Recording paper 90 is provided with five dashed lines representing reference positions over which the recording pens 31 through 35 normally ride in the absence of an input signal to their associated galvanometers. Conveniently, drive motor 96 moves paper 90 past the recording pens at a linear velocity of ¼ inch per second. The output of AND circuit 48 is coupled to an inhibiting input of AND circuit 47. The 2 output of counting flip-flop 57 actuates gate 19.

Figure 2:
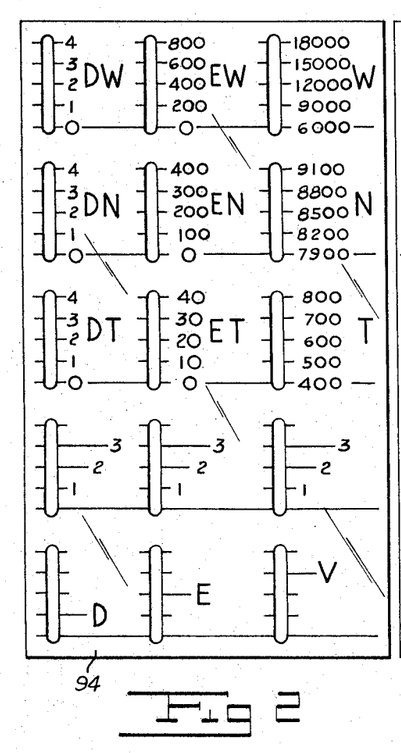
FIGURES 2 and 3 show one form of overlay sheet for interpreting one form of time-division-multiplex recording in which two auxiliary coding channels are provided.
Figure 3:
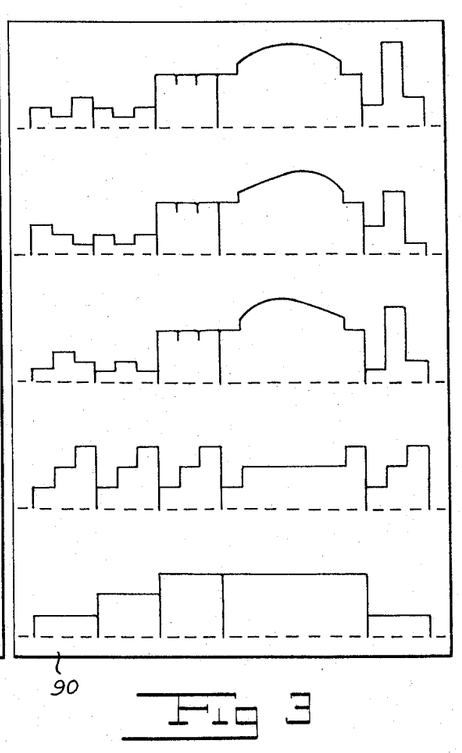

In operation of the circuit of FIGURE 1 and referring to FIGURES 1, 2, and 3, pulses from the clock source 45 are normally coupled through AND circuit 47 sequentially indexing ring counter 80. Assume it is initially desired to make a recording of percentage deviations D in the three engines. Push button 41 is momentarily depressed, setting flip-flop 51. The output of flip-flop 51 causes computer 15 to provide percentage deviations rather than actual errors, disables flip-flops 52 and 53 through OR circuits 72 and 73, actuates multiple gates 17 through OR circuit 67, enables AND circuit 56 through OR circuit 68, and applies one unit of current through resistor 61 to recording pen 35. When subsequently ring counter 80 changes from a 3 output to a 1 output, a pulse is coupled through capacitor 55 and the now enabled AND circuit 56, causing the output of the counting flip-flop 57 to change from 1 to 2. With a 1 output from ring counter 80, gates 21 are actuated, permitting the outputs of transducers 11 of engine number 1 to be coupled to computer 15. With a 2 output from counting flip-flop 57, paper 90 is driven by drum 95 and motor 96 past the recording pens. With a 1 output from ring counter 80 and a 2 output from counting flip-flop 57, one unit of current flows through resistor 81 and gate 19 to recording pen 34. The DW, DN, and DT outputs of computer 15 are coupled through the actuated gates 17 to the respective recorders 31, 32, and 33. From FIGURES 2 and 3 it will be noted that for engine number 1 the percentage deviations in fuel flow, rotative speed, and exhaust gas temperature are respectively 1%, 1.5%, and 0.5%. One second subsequently, ring counter 80 is indexed to provide a 2 output which, through resistor 82, provides two units of current to gate 19 and recording pen 34 and which actuates multiple gates 22 so that the outputs of transducers 12 of engine number 2 are coupled to computer 15. From FIGURES 2 and 3 it will be seen that for engine number 2 $DW=0.5\%$, $DN=1\%$, and $DT=1.5\%$. One second subsequently, ring counter 80 is indexed to provide a 3 output which, through resistor 83, provides three units of current to gate 19 and recording pen 34 and which actuates multiple gates 23 so that the outputs of transducers 13 of engine number 3 are coupled to computer 15. It will be seen that for engine number 3, $DW=1.5\%$, $DN=0.5\%$, and $DT=1\%$. One second subsequently, counter 80 is indexed to provide a 1 output, coupling a pulse through capacitor 55 and AND circuit 56. This indexes counting flip-flop 57 to provide a 1 output, producing a pulse through capacitor 58 which resets flip-flop 51. The indexing of counting flip-flop 57 removes the signal applied to paper drive 96. All recording pens return to the reference lines.

If it is subsequently desired to make a recording of the actual errors E, then push button 42 is momentarily depressed, setting flip-flop 52. The output from flip-flop 52 causes computer 15 to provide actual errors rather than percentage deviations, disables flip-flops 51 and 53 through OR circuits 71 and 73, actuates mutiple gates 17 through OR circuit 67, enables AND circuit 56 through OR circuit 68, and applies two units of current through resistor 62 to recording pen 35. The operation of the apparatus proceeds as before. From FIGURES 2 and 3 it will be noted that for both engines number 1 and 3, the actual errors in fuel flow, rotative speed, and exhaust gas temperature are respectively 200 pounds per hour, 100 revolutions per minute, and 5° C. For engine number 2, the actual errors are 100 pounds per hour, 50 revolutions per minute, and 10° C. Recording pen 34, which indicates the particular engine, is again sequentially subjected to one, two, and three units of current; while recording pen 35, which indicates the nature of the quantities recorded, is subjected to two units of current indicating that actual errors are being measured and recorded.

If it is desired subsequently to make a recording of the raw values V, then push button 43 is momentarily depressed which, through OR circuit 59, sets flip-flop 53. The output of flip-flop 53 actuates multiple gates 18 permitting the raw outputs from the fuel flow, rotative speed and exhaust gas temperature transducers to be coupled directly to the recording pens 31 through 33. The output from flip-flop 53 disables flip-flops 51 and 52, enables AND circuit 56 through OR circuit 68, and through resistor 63 applies three units of current to recording pen 35. The operation of the apparatus again proceeds as previously described. From FIGURES 2 and 3 it will be noted that for each of engines number 1, 2, and 3, the fuel flow is 13,500 pounds per hour, the rotative speed is 8,650 revolutions per minute, and the exhaust gas temperature is 650° C. Again, recording pen 34 is sequentially subjected to one and then two and then three units of current corresponding to the engine number; and recording pen 34 is subjected to three units of current indicating that raw values of the transducer outputs are being recorded.

In FIGURE 3 momentary switching transients may produce some movement of the recording pens when switching from engine number 1 to engine number 2 and when switching from engine number 2 to engine number 3 in recording raw values V.

Ring counter 80 subsequently enables multiple gates 21, 22, and 23 so that hysteresis circuits 25, 26, and 27 sequentially scan the engines for over-limit conditions. Suppose, for example, that one hour after the three recordings previously made by successive operations of push buttons 41, 42, and 43, engine number 2 is subjected to a bird strike, causing the fuel flow to exceed the hysteresis limit of 15,000 pounds per hour, causing the rotative speed to exceed the hysteresis limit of 8,800 revolutions per minute, and causing the exhaust gas temperature to exceed the hysteresis limit of 700° C. If with a 2 output from ring counter 80 the outputs of transducers 12 coupled through multiple gates 22 to hysteresis circuits 25 through 27 cause an output from any of the hysteresis circuits, then a signal is coupled through OR circuit 59 setting flip-flop 53. The output of flip-flop 53 partially enables AND circuit 66. When ring counter 80 subsequently indexes from 3 to 1 a pulse is applied through capacitor 55 and AND circuit 56, indexing counting flip-flop 57 from 1 to 2. With a 2 output from counting flip-flop 57, AND circuit 48 is partially enabled. During the one second interval during which ring counter 80 provides a 1 output the raw values V of the parameters of engine number 1 are recorded in the same manner as if push button 43 had been previously depressed. However, when ring counter 80 is subsequently indexed from 1 to 2, then the outputs of transducers 12 are again coupled through multiple gates 22 to hysteresis circuits 25 through 27. An output from one or more of these hysteresis circuits is now coupled through switch 65 and the now enabled AND circuit 66, thence through OR circuit 49 and the now enabled AND circuit 48 to the inhibiting input of AND circuit 47, which prevents clock pulses from source 45 from further indexing ring counter 80. Thus the raw values of the parameters of engine number 2 are continuously recorded until they drop below over-limit conditions, whereupon none of the hysteresis circuits 25 through 27 provides an output. Upon the disappearance of all hysteresis outputs the inhibiting signal applied to AND circuit 47 is removed, permitting ring counter 80 to be indexed from 2 to 3 and thus record the raw values of the parameters of engine number 3. From FIGURES 2 and 3 it will be noted that the bird strike has produce an over-limit condition for engine number 2 of 5 seconds duration for which the maximum fuel flow was 18,000 pounds per hour, the maximum rotative speed was 9,100 revolutions per minute, and the maximum exhaust gas temperature was 800° C.

Suppose thereafter it is desired to again make a recording of the percentage deviations D. Again push button 51 is momentarily depressed. From FIGURES 2 and 3 it will be noted that the percentage deviations in engines number 1 and 3 remain as previously recorded. However, for engine number 2, $DW=4\%$, $DN=3\%$, and $DT=3.5\%$. Thus a clear indication is provided of the need for overhauling engine number 2.

Normally closed release switch 65 is provided so that if one engine remains in an overlimit condition, the opening of switch 65 for a period of one second will remove the inhibiting signal from AND circuit 47 for a sufficient period that a clock pulse from source 45 will index counter 80 so that the remaining engines may be successively scanned for over-limit conditions.

We may also make an extended recording of any given engine by means of switch 85. For example, suppose it is desired to make an extended recording of engine number 1. The armature of switch 85 is then moved into engagement with contact number 1. Then any one of push buttons 41, 42, and 43 may be momentarily depressed. The normal cycle of events then ensues. However, the 1 output from ring counter 80 is now coupled to the armature of switch 85 and thence through OR circuit 49 and AND circuit 48 to the inhibiting input of AND circuit 47. It will be seen that the further indexing of ring counter 80 is prevented in the same manner as a hysteresis output from AND circuit 66. If it is subsequently desired to make a recording for an extended period of engine number 2, then the armature of switch 85 is merely moved from engagement with contact number 1 to engagement with contact number 2. The inhibiting signal to AND circuit 47 is removed, permitting ring counter 80 to be indexed from 1 to 2, whereupon the armature of switch 85 again couples a signal through OR circuit 49 and AND circuit 48 to the inhibiting circuit 47. If it is desired subsequently to make a recording for an extended period of engine number 3, then the armature of switch 85 is moved into engagement with contact number 3, which removes the inhibiting input from AND circuit 47 until ring counter 80 is subsequently indexed from 2 to 3, whereupon AND circuit 47 is again subjected to an inhibiting signal from the armature of switch 85.

If during the time an extended recording is being made of a particular engine and such engine reaches an over-limit condition, producing an output from one of hysteresis circuits 25 through 27, then such hysteresis output actuates coil S of switch 85 restoring the armature thereof to the automatic cycling position A. If the extended recording of the particular engine happens to be of the raw values V, then flip-flop 53 is set; and the hysteresis signal is coupled through AND circuit 66 to prevent further indexing of ring counter 80. However, if the extended recording of the particular engine which reaches an over-limit condition is of either the percent deviation D or the actual error E, then no hysteresis signal can be coupled through AND circuit 66 to AND circuit 47; and ring counter 80 is indexed to complete the cycle of recording. With subsequent indexing of counter 80, the output from one of hysteresis circuits 25 through 27, through OR circuit 59, sets the raw value flip-flop 53.

Referring now to FIGURE 2, the overlay sheet 94 is preferably formed of a transparent plastic material. It is provided with fifteen scales of columnarly disposed indicia with five scales in each column and three columns. Preferably the indicia are engraved and printed on the underside of the overlay sheet so as to be immediately adjacent the recording on sheet 90 in order to prevent parallax. In order to permit undisturbed viewing of the underlying recording on sheet 90, the overlay sheet 94 is provided with fifteen elongated columnarly disposed apertures associated with the scales of indicia. For the first row, the scale of the first column measures DW, the scale of the second column measures EW, and the scale of the third column measures W. For the second row, the scale of the first column measures DN, the scale of the second column measures EN, and the scale of the third column measures N. For the third row, the scale of the first column measures DT, the scale of the second column measures ET, and the scale of the third column measures T. For the fourth row, the scales of each of the columns are identical and indicate the number of the particular engine, the parameters of which are being recorded. The scales of the fourth row comprise a plurality of equally spaced indicia having a fairly large spacing so that no ambiguities in the interpretation of the engine number can occur. The scales of the fifth row comprise a plurality of equally spaced indicia having a fairly large spacing so that no ambiguities in the interpretation of the type or nature of the recorded information can occur. For the fifth row of scales, the first mark of the first column is elongated and labelled D, the second mark of the second column is elongated and labelled E, and the third mark of the third column is elongated and labelled V. The scales of the first row each contain a reference index lying along a common line for which $DW=0$, $EW=0$, and $W=6,000$. The scales of the second row each contain a reference index lying along a common line for which $DN=0$, $EN=0$, and $N=7,900$. The scales of the third row each contain a reference index lying along a common line for which $DT=0$, $ET=0$, and $T=400$. The scales of the fourth row each contain a reference index lying along a common line; and the scales of the fifth row each contain a reference index lying along a common line. In use, the overlay sheet 94 is superimposed on sheet 90 such that the reference indicia of the rows are aligned with the reference lines of sheet 90. This ensures the proper vertical registration. The overlay sheet 94 is then slid horizontally relative to the recording sheet 90 until the lowermost recording of pen 35 coincides with one of the labelled indicia of the fifth row. This ensures that the proper column of scales is being read. The overlay sheet 94 is readjusted slightly in horizontal position until the recording of pen 34 coincides with the desired engine number in such column of the fourth row. Now the recordings of pens 31, 32, and 33 may be interpreted by the scales of indicia in the first, second and third rows of such column.

Figure 4:
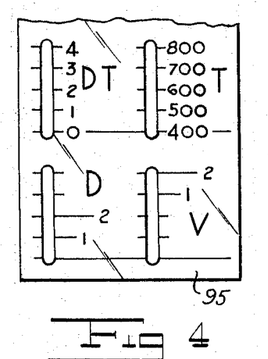
FIGURES 4 and 5 show an alternate overlay sheet and an alternate form of time-division-multiplex recording in which one auxiliary coding channel is provided.
Figure 5:
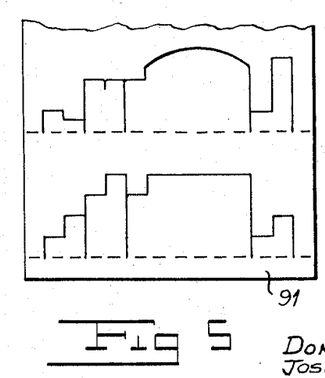

Referring now to FIGURES 4 and 5, we have shown an alternate form of presentation where the number of engines and the number of columns of indicia are reduced. For example, assume only two engines are provided and that measurements are to be made only of the percent deviations D and the raw values V. In such event some simplification of FIGURE 1 will result, as will be appreciated by those ordinarily skilled in the art. Push button 42, flip-flop 52, OR circuit 72, and resistors 83 and 63 may be eliminated. The output of flip-flop 53 would now be applied to resistor 62. Furthermore, ring counter 80 need only count to two; and, for switch 85, the switch position number 3 may be eliminated. Thus two units of current through resistor 62 to recording pen 35 would indicate the recording of the raw values V. In FIGURE 2 only two columns of indicia need be provided for measuring the percent deviations D and the raw values V. For the fifth row, representing the recording of pen 35, two units of current would now correspond to V, since three units of current would not be needed. Similarly, in the fourth row no indicia need be provided to indicate engine number 3. Finally computer 15 may be simplified, since no computation need be made of the actual errors E; and OR circuit 67 may be eliminated since the output of flip-flop 51 may be directly coupled to actuate multiple gates 17.

In FIGURES 4 and 5, however, only one auxiliary coding track is provided; and recording pen 35 is eliminated. In FIGURE 4 overlay sheet 95 is provided with only two columns and four rows of scales. In FIGURE 5 recording sheet 91 is provided with only four reference lines. The output of flip-flop 51 is not coupled to any summing resistor; and the output of flip-flop 53 is coupled through an auxiliary summing resistor having a value $R/2$ to gate 19. Thus in FIGURES 4 and 5 a recording of the percent deviations D in engine number 1 results in one unit of current through resistor 81; a recording of the percent deviation D in engine number 2 results in two units of current through resistor 82; a recording of the raw values V of engine number 1 results in three units of current to recording pen 34 comprising one unit through resistor 81 and two units through the auxiliary resistor of value $R/2$ from flip-flop 53; and a recording of raw values V of engine number 2 results in four units of current to recording pen 34 comprising two units of current through resistor 82 and two units of current through the auxiliary resistor of value $R/2$ from flip-flop 53. From FIGURES 4 and 5 it will be noted that for engine number 1; $DT=1\%$, for engine number 2, $DT=0.5\%$; and for both engines number 1 and 2, $T=650°$ C. Again the percentage deviations D are obtained by momentarily depressing push button 41; and the raw values V are obtained by momentarily depressing push button 43. In FIGURE 5 it is assumed that for engine number 2 an over-limit condition in exhaust gas temperature lasts for five seconds. After the termination of the over-limit condition, push button 41 is momentarily depressed to make a recording of percent deviations D. It will be noted that for engine number 1, DT is again 1% while for engine number 2, DT has increased to 3.5%.

In FIGURES 2 and 3 the same presentation as in FIGURES 4 and 5 might be made, since nine discrete vertical positions of recording pen 34 may be discerned without ambiguity. In such event recording pen 35 may be eliminated. The output of flip-flop 51 would be coupled to no summing resistor. The output of flip-flop 52 would be coupled through an auxiliary summing resistor having a value $R/3$ to gate 19; and the output of flip-flop 53 would be coupled through an auxiliary summing resistor having a value $R/6$ to gate 19. In such event the sensitivity of recording pen 34 should be reduced by a factor of three. For recording the percentage deviations D, pen 34 would be moved respectively through one-third, two-thirds, and one division by the respective one, two, and three units of current through resistors 81, 82, and 83. For recording the actual errors E, recording pen 34 would be moved respectively through one and one-third, one and two-thirds, and two divisions by the respective currents of one, two, and three units through resistors 81, 82, and 83 when augmented by the three units of current through the auxiliary resistor of value $R/3$ from the output of flip-flop 52. When recording the raw values V, recording pen 34 would be moved respectively through two and one-third, two and two-thirds, and three divisions by the respective one, two, and three units of current through resistors 81, 82, and 83 when augmented by the six units of current through the auxiliary resistor of value $R/6$ from the output of flip-flop 53. The overlay sheet would require nine marks for the fourth row scales. The first three marks of the first column scale would be labelled D1, D2, and D3; the second three marks of the second column scale would be labelled E1, E2, and E3; and the last three marks of the third column scale would be labelled V1, V2, and V3.

Referring now to FIGURE 6, we have shown a recording upon sheet 92 over which is superposed a further form of overlay sheet 96. We have assumed that there are four engines. In such event ring counter 80 must count to four; and its additional output would be coupled through an additional resistor having a value $R/4$ to the input of gate 19. We have further assumed that measurements are made only of the percentage deviations D, that the raw value push button 43 is not depressed, that there is no over-limit condition, and that switch 85 is in the automatic cycling position shown. For each actuation of push button 41 the recordings of DW, DN, and DT for the four engines will require a length of one inch, assuming, for example, that clock source 49 has a frequency of one cycle per second and that the speed of advancement of the paper is one quarter inch per second. For each actuation of push button 41 successive currents of 1, 2, 3, and 4 units will be coupled through gate 19 to recording pen 34, indicating the particular engine for which the percentage deviations D are being recorded by pens 31, 32, and 33. The overlay sheet 96 is preferably formed of an opaque plastic material provided with thirty-two scales of columnarly disposed indicia with four scales in each column and eight columns. The indicia are engraved and printed on the top surface of the overlay sheet. Alternatively, overlay sheet 96 may be formed of a translucent material with the indicia engraved and printed on the underside in order to prevent parallax. Overlay sheet 96 must of necessity be provided with thirty-two elongated columnarly disposed apertures associated with the scales of indicia where the overlay sheet is formed of an opaque material. Where the overlay sheet is formed of a translucent material, these apertures are again preferably provided so that the recordings appearing within the apertures will stand out from those portions of the recording which are at least partially masked by the translucent overlay sheet. The spacing between the eight columns of apertures is made precisely equal to the length required for one cycle of recording on sheet 92, which length we have assumed to be one inch. Thus the successive recordings for a single engine may be separated from all other engines so that the trend of a particular engine may be readily seen. Preferably, as shown, the distance from the left-hand column of apertures to the left-hand edge of the overlay sheet 96 and the distance from the right-hand column of apertures to the right-hand edge of the recording sheet are each equal to the spacing between adjacent columns of apertures so that the recordings adjacent the left-hand and right-hand edges of the overlay sheet are also of the same engine. This permits the interpretation of ten successive recordings for the same engine. From FIGURE 6 it will be noted that in the fourth row engine number 2 is identified in each of the eight apertures as well as adjacent the left-hand and right-hand edges of overlay sheet 96. Upon sheet 92 are shown twelve cycles of recording of which the ten cycles comprising the second through the eleventh are readily interpreted. For the second cycle of recording which is interpreted from the left-hand edge of overlay sheet 96, the percentage deviations DW, DN, and DT are 1.0%, 1.2%, and 0.6%, respectively. The third through tenth cycles of recordings are interpreted from the first through eighth columns of apertures in overlay sheet 96. The eleventh cycle of recording is interpreted from the right-hand edge of overlay sheet 96 from which it appears that the percentage deviations DW, DN, and DT have increased to 3.4%, 2.2%, and 2.8%, respectively. The successive degradation in each of the three parameters for engine number 2 from one cycle of recording to the next is readily observed.

It will be seen that we have accomplished the objects of our invention. We have provided a system in which a common parameter such as the percent deviation in exhaust gas temperature DT of the various engines is recorded in time-division-multiplex. We have provided a system in which for a single engine various parameters such as DT, ET, and T are recorded in time-division-multiplex. In our recording system the nature of time-shared information both as to the particular engine and as to the particular parameter is digitally indicated by an analog recording in one or more auxiliary coding channels. In our gas turbine engine monitoring system the various engines are sequentially scanned for an over-limit condition; and an automatic record is made of the raw values of the engine parameters for the duration of an over-limit condition. Our system is further adapted to make extended recordings of any parameter of any engine. The identification of the recorded information and the interpretation of it are readily effected by the use of our overlay sheet.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Time-division-multiplex recording apparatus including in combination a first sheet bearing a pair of parallel reference lines having a predetermined spacing, the common distance along the lines representing time as abscissa and the distances normal to the lines representing ordinates, means providing a first recording on the first sheet having ordinates associated with a first of the reference lines, means providing a second recording on the first sheet having ordinates associated with the second reference line, the first recording exhibiting step-wise ordinate changes at certain abscissa and a constant ordinate between such abscissa, each ordinate change of the first recording being a small integral multiple of a large minimum ordinate step, the second recording being at least piece-wise continuous, any discontinuity in the second recording occurring at one of such abscissa, an overlay sheet bearing a pair of reference indicia having said predetermined spacing, the overlay sheet being adapted to be superposed upon the first sheet with a first of the reference indicia overlying a portion of the first reference line and the second reference index overlying a portion of the second reference line, a first scale of indicia associated with the first reference index, a second scale of indicia associated with the second reference index, the first and second scales extending normally to the reference lines along a common abscissa, the first scale comprising a plurality of marks equally spaced by said minimum ordinate step, the overlay sheet being so constructed as to permit visual observation of the underlying two recordings in the regions adjacent the two scales, the first scale identifying the source of the information in the second recording, and the second scale indicating the values of the information in the second recording.

2. Time-division-multiplex recording apparatus including in combination a first sheet bearing a pair of parallel reference lines having a predetermined spacing, the common distance along the lines representing time as abscissa and the distances normal to the lines representing ordinates, means providing a first recording on the first sheet having ordinates associated with a first of the reference lines, means providing a second recording on the first sheet having ordinates associated with the second reference line, the first recording exhibiting step-wise ordinate changes at certain abscissa and a constant ordinate between such abscissa, each ordinate change of the first recording being a small integral multiple of a large minimum ordinate step, the second recording being at least piece-wise continuous, any discontinuity in the second recording occurring at one of such abscissa, an overlay sheet bearing a first and a second reference index disposed along a third line and a third and a fourth reference index disposed along a fourth line, the third and fourth lines being parallel and having said predetermined spacing, the overlay sheet being adapted to be superposed upon the first sheet with the first and second reference indicia overlying portions of the first reference line and the third and fourth reference indicia overlying portions of the second reference line, a first scale of indicia associated with the first reference index, a second scale of indicia associated with the second reference index, a third scale of indicia associated with the third reference index, a fourth scale of indicia associated with the fourth reference index, the first and third scales extending along a common normal to the lines, the second and fourth scales extending along a common normal to the lines, the first and second scales each comprising a plurality of marks equally spaced by said minimum ordinate step, the overlay sheet being so constructed as to permit visual observation of the underlying two recordings in the regions adjacent the four scales, the first scale identifying information of a first nature in a second recording, the second scale identifying information of a second nature in a second recording, the third scale indicating the values of the information of the first nature in the second recording, and the fourth scale indicating the values of the information of the second nature in the second recording.

3. Time-division-multiplex recording apparatus as in claim 2 in which the first scale also identifies the source of the information of the first nature in the second recording, and in which the second scale also identifies the source of the information of the second nature in the second recording.

4. Time-division-multiplex recording apparatus including in combination a first sheet bearing three parallel reference lines, the first and second lines having a certain spacing, the second and third lines having a predetermined spacing, the common distance along the lines representing time as abscissa and the distances normal to the lines representing ordinates, means providing a first recording on the first sheet having ordinates associated with a first of the reference lines, means providing a second recording on the first sheet having ordinates associated with a second of the reference lines, means providing a third recording on the first sheet having ordinates associated with the third reference line, the first recording exhibiting step-wise ordinate changes at certain abscissa and a constant ordinate between such certain abscissa, the second recording exhibiting step-wise ordinate jumps at various of said certain abscissa and a constant ordinate between such various abscissa, each ordinate change of the first recording being a small integral multiple of a large minimum ordinate step, each ordinate jump of the second recording being a small integral multiple of a large minimum ordinate jump, the third recording being at least piece-wise continuous, any discontinuity in the third recording occurring at one of said certain abscissa, an overlay sheet bearing a first and a second reference index disposed along a fourth line and a third and fourth reference index disposed along a fifth line and a fifth and a sixth reference index disposed along a sixth line, the fourth and fifth and sixth lines being parallel, the fourth and fifth lines having said certain spacing and the fifth and sixth lines having said predetermined spacing, the overlay sheet being adapted to be superposed upon the first sheet with the first and second reference indicia overlying portions of the first reference line and the third and fourth reference indicia overlying portions of the second reference line and the fifth and sixth reference indicia overlying portions of the third reference line, a first scale of indicia associated with the first reference index, a second scale of indicia associated with the second reference index, a third scale of indicia associated with the third reference index, a fourth scale of indicia associated with the fourth reference index, a fifth scale of indicia associated with the fifth reference index, a sixth scale of indicia associated with the sixth reference index, the first and third and fifth scales extending along a common normal to the lines, the second and fourth and sixth scales extending along a common normal to the lines, the first and second scales comprising a plurality of marks equally spaced by said minimum ordinate step, the third and fourth scales comprising a plurality of marks equally spaced by said minimum ordinate jump, the overlay sheet being so constructed as to permit visual observation of the underlying three recordings in the regions adjacent the six scales, the third scale identifying information of a first nature in the third recording, the fourth scale identifying information of a second nature in the third recording, the first scale identifying the source of the information of the first nature in the third recording, the second scale identifying the source of the information of the second nature in the third recording, the fifth scale indicating the values of the information of the first nature in the third recording, and the sixth scale indicating the values of the information of the second nature in the third recording.

5. Time-division-multiplex recording apparatus including in combination a first sheet, means actuatable to provide a first recording on the first sheet, means for providing a second recording on the first sheet, an overlay sheet bearing a first and a second scale disposed in a common column, the overlay sheet being adapted to be superposed upon the first sheet with the first scale overlying a portion of the first recording and the second scale overlying a portion of the second recording, the overlay sheet being so constructed as to permit visual observation of the underlying two recordings in the regions adjacent the two scales, the first scale comprising a plurality of equally spaced marks having associated indicia which discretely identify the source of the information in the second recording, the second scale comprising a plurality of marks having associated indicia which indicate the values of the information in the second recording, and means responsive to the second recording means for actuating the first recording means.

6. Time-division-multiplex recording apparatus including in combination a first sheet, means for providing a pair of recordings on the first sheet, an overlay sheet bearing a first and a second scale of indicia disposed in a first row and a third and a fourth scale of indicia disposed in a second row, the first and third scales being disposed in a first column, the second and fourth scales being disposed in a second column, the indicia of the four scales being columnarly disposed, a first reference index associated with the first scale, a second reference index associated with the second scale, a third reference index associated with the third scale, a fourth reference index associated with the fourth scale, the first and second reference indicia being disposed along a first line, the third and fourth reference indicia being disposed along a second line, the first and second lines being parallel, the first and second scales comprising a plurality of equally spaced marks, the overlay sheet being adapted to be superposed upon the first sheet with the first and second scales overlying portions of one recording and the third and fourth scales overlying portions of the other recording, the overlay sheet being so constructed as to permit visual observation of the underlying two recordings in the regions adjacent the four scales, the first scale identifying information of a first nature in the second recording, the second scale identifying information of a second nature in the second recording, the third scale indicating the values of the information of the first nature in the second recording, and the fourth scale indicating the values of the information of the second nature in the second recording.

7. Time-division-multiplex recording apparatus as in claim 6 in which the first scale also identifies the source of the information of the first nature in the second recording, and in which the second scale also identifies the source of the information of the second nature in the second recording.

8. Time-division-multiplex recording apparatus including in combination a first sheet, means for providing a first and a second and a third recording on the first sheet, an overlay sheet bearing a first and a second scale of indicia disposed in a first row and a third and a fourth scale of indicia disposed in a second row and a fifth and a sixth scale of indicia disposed in a third row, the first and third and fifth scales being disposed in a first column, the second and fourth and sixth scales being disposed in a second column, the indicia of the six scales being columnarly disposed, a first reference index associated with the first scale, a second reference index asociated with the second scale, a third reference index associated with the third scale, a fourth reference index associated with the fourth scale, a fifth reference index associated with the fifth scale, a sixth reference index associated with the sixth scale, the first and second reference indicia being disposed along a first line, the third and fourth reference indicia being disposed along a second line, the fifth and sixth reference indicia being disposed along a third line, the first and second and third lines being parallel, the first and second scales comprising a plurality of marks equally spaced by a certain distance, the third and fourth scales comprising a plurality of marks equally spaced by a predetermined distance, the overlay sheet being adapted to be superposed upon the first sheet with the first and second scales overlying portions of the first recording and the third and fourth scales overlying portions of the second recording and the fifth and sixth scales overlying portions of the third recording, the overlay sheet being so constructed as to permit visual observation of the underlying three recordings in the regions adjacent the six scales, the first scale identifying information of a first nature in the third recording, the second scale identifying information of a second nature in the third recording, the third scale identifying the source of the information of the first nature in the third recording, the fourth scale identifying the source of the information of the second nature in the third recording, the fifth scale indicating the values of the information of the first nature in the third recording, and the sixth scale indicating the values of the information of the second nature in the third recording.

9. Time-division-multiplex recording apparatus including in combination a sheet bearing a pair of substantially parallel reference lines, the common distance along the lines representing time as abscissa and the distances normal to the lines representing ordinates, means actuatable to provide a first recording on the sheet having ordinates associated with a first of the reference lines, means providing a second recording on the sheet having ordinates associated with the second reference line, the first recording comprising step-wise ordinate changes at certain abscissa and a constant ordinate between such abscissa, each ordinate change of the first recording being a small integral multiple of a large minimum ordinate step, the second recording comprising step-wise ordinate changes at such abscissa and a variable ordinate between such abscissa, and means responsive to the second recording means for actuating the first recording means.

10. Time-division-multiplex recording apparatus including in combination a sheet bearing three substantially parallel reference lines, the common distance along the lines representing time as abscissa and the distances normal to the lines representing ordinates, means actuatable to provide a first recording on the sheet having ordinates associated with the first of the reference lines, means actuatable to provide a second recording on the sheet having ordinates associated with a second of the reference lines, means providing a third recording on the sheet having ordinates associated with the third reference line, the first recording comprising step-wise ordinate changes at certain abscissa and a constant ordinate between such certain abscissa, the second recording comprising step-wise ordinate jumps at various of said certain abscissa and a constant ordinate between such various abscissa, each ordinate change of the first recording being a small integral multiple of a large minimum ordinate step, each ordinate jump of the second recording being a small integral multiple of a large minimum ordinate jump, the third recording comprising stepwise ordinate changes at said certain abscissa and a variable ordinate between said certain abscissa, and means responsive to the third recording means for actuating the first and second recording means.

11. Time-division-multiplex recording apparatus for a plurality of engines including in combination a first and a second analog recording device, means associated with each of the engines for providing a common engine parameter, a clock source, a counting device providing a number of outputs at least equal to the number of engines, means coupling the clock source to the counting device, and means responsive to the counting device for sequentially coupling said parameter of each of the engines to the first recording device and for sequentially coupling to the second recording device a digitally discrete analog signal.

12. Time-division-multiplex recording apparatus for a plurality of engines including in combination an analog recording device comprising a drive motor, means associated with each engine for providing a common engine parameter, means providing an initiating signal, means responsive to the initiating signal for exciting the drive motor and for sequentially coupling said parameter of each of the engines to the recording device in a predetermined order, and means responsive to the completion of one cycle of sequential coupling for disabling the drive motor.

13. Time-division-multiplex recording apparatus for a plurality of engines including in combination an analog recording device, first means associated with each of the engines for providing a first common engine parameter, second means associated with each of the engines for providing a second common engine parameter, first and second manually operable members, means responsive to operation of the first member for sequentially coupling said first parameter of each of the engines to the recording device in a predetermined order, and means responsive to operation of the second member for sequentially coupling said second parameter of each of the engines to the recording device in said predetermined order.

14. Time-division-multiplex recording apparatus for a plurality of engines including in combination an analog recording device, means associated with each of the engines for providing a common engine parameter, a hysteresis circuit, means for sequentially coupling said parameter of each of the engines to the hysteresis circuit, and means responsive to the hysteresis circuit for selectively coupling said parameter of one engine to the recording device.

15. Time-division-multiplex recording apparatus for a plurality of engines including in combination an analog recording device, means associated with each of the engines for providing a common raw engine parameter, a hysteresis circuit, a computer, means for sequentially coupling said raw parameter of each of the engines to the hysteresis circuit and to the computer, the computer sequentially providing modified parameter outputs for each of the engines, a manually operable member, means responsive to operation of the member for coupling to the recording device said sequential modified parameter outputs of the computer, and means responsive to the hysteresis circuit for selectively coupling the raw parameter of one engine to the recording device.

16. Time-division-multiplex recording apparatus for a plurality of engines including in combination an analog recording device, means associated with each of the engines for providing a common raw engine parameter, a hysteresis circuit, a computer, means for sequentially coupling said raw parameter of each of the engines to the hysteresis circuit and to the computer, the computer sequentially providing for each of the engines modified parameter outputs, a first and a second manually operable member, means responsive to operation of the first member for sequentially coupling said raw parameter of each of the engines to the recording device, means responsive to operation of the second member for coupling to the recording device said sequential modified parameter outputs of the computer, and means responsive to the hysteresis circuit for selectively coupling the raw parameter of one engine to the recording device.

17. Time-division-multiplex recording apparatus for a plurality of engines including in combination an analog recording device, means associated with each of the engines for providing a common engine parameter, a clock source, a counting device providing a number of outputs at least equal to the number of engines, means normally coupling the clock source to a counting device, means responsive to the counting device for sequentially coupling said parameter of each of the engines to the recording device, and means for selectively disabling the means coupling the clock source to the counting device.

18. Time-division-multiplex recording apparatus including in combination a sheet bearing a pair of substantially parallel reference lines, a first analog recording device associated with a first of the reference lines, a second analog recording device associated with the second reference line, the two recording devices being aligned substantially normal to the reference lines, means for providing relative motion between the recording devices and the sheet along the reference lines, a plurality of information sources, means for selectively coupling one of the information sources to the first recording device, and means responsive to the selective means for coupling a digitally discrete analog signal to the second recording device.

19. Time-division-multiplex recording apparatus including in combination a sheet bearing three substantially parallel reference lines, a first analog recording device associated with a first of the reference lines, a second analog recording device associated with a second of the reference lines, a third analog recording device associated with the third reference line, the three recording devices being aligned substantially normal to the reference lines, means for providing relative motion between the recording devices and the sheet along the reference lines, a first plurality of information sources, a second plurality of information sources, means for selectively coupling one of the information sources of one of the pluralities to the first recording device, means responsive to the selective means for coupling to the second recording device a digitally discrete analog signal in accordance with said one plurality, and means responsive to the selective means for coupling to the third recording device a digitally discrete analog signal in accordance with said one information source.

20. Time-division-multiplex recording apparatus including in combination a first and a second analog recording device, a plurality of information sources, means for selectively coupling one of the information sources to the first recording device, and means responsive to the selective means for coupling a digitally discrete analog signal to the second recording device.

21. Time-division-multiplex recording apparatus including in combination a first and a second and a third analog recording device, a first plurality of information sources, a second plurality of information sources, means for selectively coupling one of the information sources of one of the pluralities to the first recording device, means responsive to the selective means for coupling to the second recording device a digitally discrete analog signal in accordance with said one plurality, and means responsive to the selective means for coupling to the third recording device a digitally discrete analog signal in accordance with said one information source.

22. Time-division-multiplex recording apparatus including in combination a first sheet bearing a reference line, the distance along the line representing time as abscissa and the distances normal to the line representing ordinates, means providing a recording on the sheet having ordinates associated with the reference line, the recording having ordinates representing information from a first source at a first plurality of discrete and equally spaced abscissa, the recording having ordinates representing information from a second source at a second plurality of discrete and equally spaced abscissa, the spacing between adjacent abscissa of the first plurality being equal to that of the second plurality, an overlay sheet bearing a group of reference indicia disposed along a second line, the overlay sheet being adapted to be superposed upon the first sheet with the reference indicia overlying portions of the reference line, a group of scales of indicia, each scale being associated with a corresponding reference index, the scales extending normally to and being equally spaced along the second line, the spacing between adjacent scales being equal to the spacing between adjacent abscissa of each of the pluralities, and the overlay sheet being so constructed as to permit visual observation of the underlying recording at least in the regions adjacent the scales.

23. Time-division-multiplex recording apparatus including in combination a first sheet bearing a reference line, the distance along the line representing time as abscissa and the distances normal to the line representing ordinates, means providing a recording on the sheet having ordinates associated with the reference line, the recording having ordinates representing information from a first source at a first plurality of discrete and equally spaced abscissa, the recording having ordinates representing information from a second source at a second plurality of the discrete and equally spaced abscissa, the spacing between adjacent abscissa of the first plurality being equal to that of the second plurality, an overlay sheet bearing a group of reference indicia disposed along a second line, the overlay sheet being adapted to be superposed upon the first sheet with the reference indicia overlying portions of the reference line, a group of scales of indicia, each scale being associated with a corresponding reference index, the scales extending normally to and being equally spaced along the second line, the spacing between adjacent scales being equal to the spacing between adjacent abscissa of each of the pluralities, and the overlay sheet being so constructed as to at least partially obscure visual observation of the underlying recording except in the regions adjacent the scales.

24. Time-division-multiplex recording appaartus as in claim 23 in which one scale extends along a margin of the overlay sheet and in which said margin extends normally to the second line.

25. Time-division-multiplex recording apparatus as in claim 23 in which a first scale extends along a first margin of the overlay sheet, in which a second scale extends along a second margin of the overlay sheet, and in which the first and second margins extend normally to the second line.

References Cited by the Examiner
UNITED STATES PATENTS

| | | | |
|---|---|---|---|
| 2,489,253 | 11/1949 | Andre | 346—33 X |
| 2,845,712 | 8/1958 | Stimler | 33—1 |
| 2,860,832 | 11/1958 | Burns | 346—14 X |
| 2,959,459 | 11/1960 | Ryan | 346—23 X |
| 3,065,466 | 11/1962 | Hickman | 346—30 X |

RICHARD B. WILKINSON, *Primary Examiner.*

J. W. HARTARY, *Assistant Examiner.*